United States Patent [19]

Kissel

[11] Patent Number: 5,194,182

[45] Date of Patent: Mar. 16, 1993

[54] SALT-CONTAINING POLYMER COMPOSITIONS

[75] Inventor: Charles L. Kissel, Anaheim, Calif.

[73] Assignee: Union Oil Company of California, Los Angeles, Calif.

[21] Appl. No.: 660,784

[22] Filed: Feb. 22, 1991

Related U.S. Application Data

[62] Division of Ser. No. 305,451, Feb. 1, 1989, Pat. No. 5,004,562.

[51] Int. Cl.$^5$ .......................... H01B 1/00; C08K 3/00; C08J 3/03
[52] U.S. Cl. ..................... 252/518; 252/519; 252/520; 252/521; 252/508; 252/309; 521/457
[58] Field of Search ............... 252/518, 519, 520, 521, 252/308, 309; 524/457

[56] References Cited

U.S. PATENT DOCUMENTS

| | | | |
|---|---|---|---|
| 3,330,696 | 7/1967 | Pechini | 427/79 |
| 3,676,362 | 7/1972 | Yates | 252/309 |
| 3,900,620 | 8/1975 | Gilman et al. | 428/537 |
| 3,964,832 | 6/1976 | Cohen et al. | 252/316 |
| 4,810,418 | 3/1989 | Burvee | 252/500 |

OTHER PUBLICATIONS

Eror, Nicholas G. and Anderson, Harlan U., Polymeric Precursor Synthesis of Ceramic Materials, *Mat. Soc. Res. Symp. Proc.* vol. 73, pp. 571–577 (1986).

Budd, K. D. and Payne, D. A., Preparation of Strontium Titanate Ceramics and Internal Boundary Layer Capacitors by the Pechini Method, *Mat. Res. Soc. Symp. Proc.*, vol. 32, pp. 239–244 (1984).

Lessing, Paul A., Mixed-Cation Oxide Powders via Polymeric Precursors, *American Ceramic Society Bulletin*, May 1989, pp. 1002–1007.

*Primary Examiner*—Mark L. Bell
*Assistant Examiner*—C. Melissa Bonner
*Attorney, Agent, or Firm*—Gregory F. Wirzbicki; Alan H. Thompson

[57] ABSTRACT

An electrically conductive polymer composition containing a nonconjugated polymer and a salt is prepared by admixing a sol or gel composition containing the salt with a polymer. A novel sol or gel composition containing a nonionic surfactant stabilizer is useful for preparing the electrically conductive composition. An intermediate mixture of salt, stabilizer and solvent are heated to prepare a sol or gel which is typically admixed with a latex to produce a product admixture containing the salt and a latex polymer. The product admixture is dried to produce a resultant latex polymer/salt composition having electrically conductive properties useful, as for example, as an antistatic carpet coating.

42 Claims, No Drawings

SALT-CONTAINING POLYMER COMPOSITIONS

This is a division of application Ser. No. 305,451, filed Feb. 1, 1989, now U.S. Pat. No. 5,004,562.

BACKGROUND OF THE INVENTION

The invention relates to polymer compositions, sol or gel compositions, electrically conductive compositions containing a latex polymer, and the preparations thereof.

The achievement of tailored electrical properties of compositions containing polymers is usually pursued in several ways. One approach consists of modifying the intrinsic bulk properties of polymers by processing, especially by pyrolysis. In this approach, acceptable electrical properties are developed by altering the chemical composition or structure of the initial material. A second approach is to attain the desired conductivity by incorporating macroscopic pieces of conducting material (metal flakes, carbonblack particulates, or carbon fibers, for example) in host polymers to form conducting composites. It is the traditional approach in the preparation of conducting polymers and is used today in the fabrication of nearly all commercial products based on conductive polymers. Another approach focuses on increasing the electrical conductance of conjugated polymers (i.e., polymers which already have at least some electrical conductance) at the molecular level by controlled incorporation of molecular dopants that may or may not form charge-transfer complexes with the host conjugated polymer. It is called molecular doping because it consists of diffusing isolated molecular dopants ($AsF_5$ or $I_2$, for example) into conjugated polymers.

Polymers capable of being stabilized in aqueous media are called latex polymers and a latex ordinarily contains at least one latex polymer and at least one surfactant dispersed in water. Presently, latex polymers are not conjugated, e.g., latex polymers are considered insulators. In order to produce acceptable electrical conductance properties in compositions containing latex polymers, materials responsible for such conductance must be compatibly combined with the latex. Compositions containing latex polymers coagulate when admixed with aqueous solutions of salts. For instance, an aqueous solution of cupric acetate added to a latex composition containing styrene butadiene rubber will cause coagulation of the styrene butadiene rubber within a short time after contact.

However, investigators have prepared hydrosols which contain materials such as colloidal antimony oxide in an attempt to find materials which may be added compatibly to a latex composition (i.e., added without coagulation). For example, in U.S. Pat. No. 3,960,989 issued to Petrow et al., a colloidal antimony oxide (hydrosol) was mixed in equal amounts with polyvinylidene chloride (PVDC) to improve the clarity of PVDC films.

The search continues for methods to compatibly mix salts with latex polymers. The resultant admixture of latex and salt provides for a number of useful compositions such as electrically conductive compositions containing latex polymers.

SUMMARY OF THE INVENTION

The invention relates to a substantially nonaqueous composition containing a latex polymer and a salt. The salt is dispersed in the latex polymer in the form of anions and cations and/or colloidal salt particulates. The resultant latex polymer/salt composition is usually prepared by admixing a composition containing a starting latex polymer with a sol or gel containing a salt.

In one embodiment of the invention, a novel process is used to prepare a nonaqueous sol or gel wherein at least one nonaqueous solvent, at least one stabilizer, and at least one salt are admixed and then heated to a temperature sufficient to produce a sol or gel containing the salt. An acidic component is also usually added to the admixture prior to heating The nonaqueous solvent is usually a form of polyhydroxyl ether or polyhydroxyl alcohol, the stabilizer is usually a chelator, such as a hydroxycarboxylic acid, or a nonionic surfactant, and the admixture is usually heated to a temperature less than 100° C. to form a product sol or gel composition. After cooling with optional addition of more acid component, such a product sol or gel may be admixed with a composition containing a starting latex polymer to produce a stable, noncoagulated product admixture composition containing a latex polymer and a salt.

In another embodiment, a novel sol or gel composition contains at least one solvent, at least one salt, and a stabilizer comprising a nonionic surfactant. A typical nonionic surfactant has the formula

$$R\text{-}(EO)_x(PO)_y\text{-}R^1$$

wherein each of R and $R^1$ is independently selected from hydrogen, hydroxyl, alkyl, aryl, monoalkylaryl, dialkylaryl, aliphatic ester and aryl ester radicals, EO is ethylene oxide, PO is propylene oxide and x and y are nonnegative integers.

In still another embodiment, the invention relates to a novel intermediate composition useful in the preparation of a sol or gel. The composition includes a mixture of at least one solvent, at least one salt, and a stabilizer comprising a nonionic surfactant. Ordinarily the solvent is nonaqueous, and the pH is less than 7.0 and is capable of being heated to form a sol or gel.

The sol or gel compositions of the invention may be admixed with a composition containing a starting polymer to starting polymer. The product admixture is dried to produce a product composition containing the salt from the sol or gel and the polymer. The salt is dispersed in the polymer in a form compatible to the particular polymer.

In a preferred embodiment of the invention, a stable, noncoagulated product admixture composition is prepared by admixing an above-mentioned sol or gel composition with a composition containing a starting latex polymer. The stable, noncoagulated product admixture containing the latex polymer and sol or gel is dried to produce a resultant latex polymer/salt composition which is highly useful as a latex polymer composition having electrically conductive properties. Other applications of the resultant latex polymer/salt compositions include their use as biocidal polymers, polymer coatings for anodic and cathodic protection, microwave food coatings, gloss enhanced polymers, laminated coatings as barriers to stain migration in textiles and floor coverings, sorbents containing flame retardant sols, polymers useful as delay cross linkers in reservoir plugging, polymers for thermal heating elements, catalytic agents, and antistatic adhesive tapes.

DETAILED DESCRIPTION OF THE INVENTION

A sol or gel is prepared for addition to a composition containing a starting latex polymer. The sol or gel composition is prepared by admixing, in any order, at least one solvent, at least one stabilizer, and at least one salt. In an alternative embodiment, an acidic component may also be added to the admixture.

Typical solvents utilized in the preparation of the sol or gel include nonaqueous solvents such as organic solvents, particularly polyols, such as for example a polyhydroxyl ether or a polyhydroxyl alcohol. Nonaqueous sols or gels containing organic solvents and essentially no water are typically referred to as organosols or organogels. More particular examples of useful solvents for preparing organosols or organogels include ethylene glycol, glycerine, pentanediol, polyoxyethylene glycol, polyoxypropylene glycol, mixed (polyoxyethlene-polypropylene) glycol and blocked (polyoxyethlenepolyoxypropylene) glycol.

In the preparation of the sol or gel composition, at least one stabilizer is added to the admixture. The stabilizer is usually a chelator and/or a nonionic surfactant. Examples of common chelators useful in the invention are hydroxycarboxylic acids such as citric acid, tartaric acid, mesotartaric acid, glycolic acid, γ-hydroxybutyric acid, mandelic acid, glyceric acid, malic acid and lactic acid, with citric acid being the most highly preferred. The nonionic surfactant stabilizers ordinarily contain ethylene oxide (EO) and/or propylene oxide (PO). The nonionic surfactant stabilizers may also include mixed EO-PO or blocked EO-PO arrays. One example of a nonionic surfactant has the formula

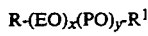

wherein each of R and $R^1$ is independently selected from hydrogen, hydroxyl, alkyl, aryl, monoalkylaryl, dialkylaryl, aliphatic ester and aryl ester radicals, and x and y are nonnegative integers. Another nonionic stabilizer is a glycerine derived nonionic surfactant having the formula

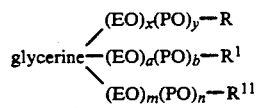

wherein each of R, $R^1$ and $R^{11}$ is independently selected from hydrogen, hydroxyl, alkyl, aryl, monoalkylaryl, dialkylaryl aliphatic ester and aryl ester radicals, and x, y, a, b, m and n are nonnegative integers. Illustrative of nonionic surfactants are alkylpolyglycol ethers such as ethoxylation products of lauryl, oleyl, and stearyl alcohols or mixtures of such alcohols as coconut fatty alcohols; alkylphenol polyglycol ethers such as ethoxylation products of octyl- or nonylphenol, diisopropylphenol, triisopropylphenol, di- or tritertiarybutyl phenol, etc. Preferred nonionic surfactants include mono- or dialkyl oxyalkylated phenolics. A highly preferred nonionic surfactant useful herein contains about 1 to about 100 percent by weight of ethylene oxide in combination with 0 to about 99 percent by weight of propylene oxide and has a molecular weight from about 62 to about 5,000. Examples of such surfactants include 6–50 mol EO lauryl alcohol, 6–50 mol EO cetyl alcohol, 6–50 mol EO mystryl alcohol, 6–50 mol EO stearyl alcohol, 6–50 mol EO phenol, 6–50 mol EO butyl phenol, 6–50 mol RO octyl phenol, 6–50 mol EO decyl phenol, 6–50 mol EO dodecyl phenol, 6–50 mol EO nonyl phenol, and 10–90 mol EO sorbitan monolaurate or monocetylate, monomystralate or monostearate. Numerous other examples of suitable nonionic surfactants are disclosed in U.S. Pat. Nos. 2,600,831, 2,271,622, 2,271,623, 2,275,727, 2,787,604, 2,816,920, and 2,739,891, the disclosures of which are incorporated herein by reference in their entireties.

Any salt is useful in the invention. Both organic and inorganic salts may be utilized. The salt must be capable of (1) existing as colloidal salt particulates, (2) existing in ion species or (3) forming ions when dispersed in a composition containing a latex polymer. In the formation of a sol or gel, the salt contains cations or anions capable of being dispersed in the admixture of solvent and stabilizer. The anions or cations of the salt are usually metallic cations or metallic-containing anions, monomeric nonmetallic cations or monomeric nonmetallic anions, or polymeric nonmetallic cations or polymeric nonmetallic anions. Any metal or nonmetal may be contained in the cations or anions. Useful metallic cations of the salt include the cations of antimony, yttrium, cadmium, silver, calcium, cerium, manganese, nickel, niobium, lead, uranium, barium, chromium, cesium, copper, lithium, sodium, potassium, palladium, praseodymium, aluminum, cobalt, iron, gold, lanthanum, magnesium, thallium, zinc, dysprosium, samarium, gadolinium, erbium, strontium, ytterbium, titanium and mercury. Examples of useful monomeric nonmetallic cations of the salt include ammonium, boron and silicon-containing cations. Useful monomeric nonmetallic anions of the salt include those containing nitrates, acetates, halides, borates, formates, citrates, benzoates, tartrates, phosphates, silicates, nitrites, carbonates, oxides and alkoxides. Examples of a number of metallic-containing anions useful herein include those containing the elements arsenic, chromium, manganese, tin, aluminum, titanium, zirconium, vanadium or molybdenum. Salts useful herein containing nonmetallic anions typically contain an element such as fluorine, oxygen, nitrogen, carbon, tellurium, selenium, phosphorus, sulfur, chlorine, bromine and iodine. Furthermore, the salts may provide polymeric cations such as monoolefinic quaternary ammonium cations, diolefinic quaternary ammonium cations, triolefinic quaternary ammonium cations and tetraolefinic quaternary ammonium cations. Also the salts may contain polymeric anions such as alkyl, aryl, ether, or alkylaryl sulfonates, sulfates, phosphates, carboxylates and polycarboxylates.

In the process of preparing the sol or gel, an acidic component is sometimes added to the admixture of solvent, stabilizer and salt. Usually the acid component is added to provide for a transparent product. The acidic component is usually a protic acid, such as concentrated nitric acid, concentrated hydrochloric acid or concentrated sulfuric acid; however, a Lewis acid may also be utilized. An acidic component may be added to the admixture of solvent, stabilizer and salt either before, during or after the admixture is heated to a temperature sufficient to form a sol or gel.

The admixture of solvent, stabilizer and salt, and optionally an acidic component is ordinarily prepared at room temperature and the temperature raised usually to less than 100° C. to produce a sol or gel containing the desired salt. The temperature to which the admixture is heated is usually dependent upon the particular salt or salts contained in the admixture; however, a significant number of admixtures containing a salt, particularly an inorganic salt, are heated to a temperature in the range from about 30° C. to about 90° C. and more preferably in the range from about 35° C. to about 85° C. In one embodiment for preparing the sol or gel containing a solvent, stabilizer, salt and acidic component, the ingredients are admixed at room temperature and slowly heated to a temperature in the range from about 35° C. to about 85° C. for a period sufficient to produce a transparent product, ordinarily from about 0.5 to about 15 hours and having the color of the characteristic anion or cation of the particular salt in the admixture. The transparent product is a sol or gel composition containing the cations and anions and/or colloidal salt particulates of the particular salt of the admixture. Often the transparent product becomes cloudy or opaque when the admixture is cooled to room temperature. If the transparent product becomes opaque or cloudy, additional sufficient portions of the acidic component may be added to the opaque product to produce a sol or gel composition having substantially the same degree of transparency and clarity as observed at the elevated temperature necessary to initially form the sol or gel.

Whether or not the acidic component is added to the admixture of solvent, stabilizer and salt, the pH of the admixture, either before or after heating, is generally less than 7.0 and usually less than 4.0. It is preferred that the pH of the admixture of the sol or gel composition be less than about 3.0, particularly when the acidic component is added to the admixture, and it is highly preferred that the pH be less than about 1.0. Also, as will be seen hereinafter in the examples, many instances exist where the pH of the sol or gel composition is less than about 0.1.

In another embodiment of the invention, a novel sol or gel composition is prepared by heating a mixture of at least one solvent with at least one salt and a stabilizer containing a nonionic surfactant. An acidic component may optionally be added to the admixture either before or after heating the admixture to a temperature sufficient to form a sol or gel composition; typically such a temperature is in the range from about 30° to about 95° C. The solvent is typically a nonaqueous solvent, commonly an organic solvent, which, in admixture with the nonionic surfactant and the salt, comprises an organosol or organogel when the temperature of the admixture has been increased sufficiently to form the sol or gel composition.

The sol or gel composition described herein may be combined with a composition containing a polymer to produce a product admixture containing the components of the sol or gel composition and the polymer. Preferably, a stable, noncoagulated product admixture composition containing a latex polymer and a salt is prepared by admixing the sol or gel composition described herein with a composition containing a starting latex polymer. Although the above described sol or gel composition may be admixed with a composition containing any starting polymer, a latex polymer is preferably employed as the starting latex polymer to which the sol or gel composition is admixed. As used herein, any polymer capable of being dispersed, emulsified or suspended in a latex is considered a latex polymer. The latex polymer utilized herein is not conjugated. Preferred starting latex polymers of the invention include (1) conjugated diolefin polymers containing one or more conjugated diene monomers having 4 to 8 carbon atoms, preferably containing at least 10 weight percent of the conjugated diene monomers, and usually in combination with one or more alkenyl substituted monoaromatic monomers, typically in the range from about 1 to about 70 weight percent of the latex polymer, (2) olefinester interpolymers containing a monoolefin monomer having up to 4 carbon atoms and an alkenyl or alkenol ester of a saturated carboxylic acid, preferably containing at least 10 weight percent of the polymer, (3) olefinically unsaturated carboxylic acid ester polymers containing polymerized, olefinically unsaturated monomers containing polymerized olefinically unsaturated carboxylic acid ester monomers, preferably containing at least 10 weight percent of the latex polymer, (4) polymers of olefinically unsaturated monomers containing alkenyl ether monomer units, preferably in the amount of at least 10 weight percent of the latex polymer, (5) polymers of vinylidene chloride or vinyl chloride with or without other polymerized, olefinically unsaturated monomers, and (6) combinations thereof.

The compositions containing starting latex polymers can be prepared as aqueous dispersions, emulsions, suspensions, and the like, by procedures known in the art to be suitable for preparation of the aforementioned 5 classes of starting latex polymers. For instance, aqueous starting latex polymer dispersions can be prepared by gradually adding each monomer simultaneously to an aqueous reaction medium at a rate proportionate to the respective percentage of each monomer in a finished polymer and initiating and continuing polymerization by providing in the aqueous reaction medium a suitable polymerization catalyst. Illustrative of such catalysts are free radical initiators and redox systems such as hydrogen peroxide, potassium or ammonium peroxydisulfate, dibenzoyl peroxide, lauryl peroxide, di-tertiarybutyl peroxide, bisazodiisobutyronitrile, either alone or together with one or more reducing components such as sodium bisulfite, sodium metabisulfite, glucose, ascorbic acid, erythorbic acid, etc. The reaction is continued with agitation at a temperature sufficient to maintain an adequate reaction rate until all added monomers are consumed. Monomer addition is usually continued until the latex (dispersion) reaches a polymer concentration of about 10 to about 60 weight percent.

Protective colloids may be added to an aqueous polymer dispersion either during or after the reaction period Illustrative protective colloids include gum arabic, starch, alginates, and modified natural substances such as methyl-, ethyl-, hydroxyalkyl-, and carboxymethyl cellulose, and synthetic substances such as polyvinyl alcohol, polyvinyl pyrrolidone, and mixtures of two or more of such substances. Fillers and/or extenders, such as dispersible clays and colorants, including pigments and dyes, can also be added to the aqueous dispersions either during or after polymerization.

Polymer concentrations in compositions containing a starting latex polymer, particularly those with dispersions in aqueous media, are ordinarily greater than about 0.1 weight percent of the composition. Usually the concentrations are greater than 1 weight percent and preferably greater than 5 weight percent, but most commonly in the range from about 40 to 70 percent for those latexes resulting from emulsion polymerization. The dispersed polymer particles in the composition containing the starting latex polymer can be of any size suitable for the intended use, although particle sizes of usually at least about 120 nanometers are presently preferred since latex viscosity increases as particle size is reduced substantially below that level. Most often, the described latexes will have polymer particle sizes within the range from about 120 to about 300 nanometers as determined on the N-4 "Nanosizer" available from Colter Electronics, Inc., of Hialeah, Florida.

The stable, noncoagulated product admixture composition produced by the admixing of the sol or gel composition with the composition containing at least one starting latex polymer is usually dried by suitable methods known in the art to produce a dried, substantially nonaqueous resultant latex polymer/salt composition. For instance, when the composition containing at least one starting latex polymer is an aqueous dispersion, the product admixture composition is usually air dried or oven dried at a temperature less than about 100° C.

The dried (nonaqueous) resultant latex polymer/salt composition ordinarily contains less water than contained in the aqueous dispersion of the starting latex polymer, and preferably contains substantially no water, e.g., less than 1 weight percent water in the resultant latex polymer/salt composition. The resultant latex polymer/salt composition usually contains the same starting latex polymer; however, it is within the scope of the present invention that the starting latex polymer can be converted to a different latex polymer after admixture of the sol or gel with the starting latex polymer. At least one cation and/or at least one anion of the salt is dispersed in the dried resultant latex polymer/salt composition. Although the invention is not bound by any theory, it is believed that at least some of the particulates derived from the starting salt exists as colloidal salt particulates dispersed in the resultant latex polymer/salt composition.

The concentration of the salt in any of the compositions described herein is dependent upon the use of the particular composition. Ordinarily, a concentration of greater than about 0.001 weight percent of salt in the sol or gel gel is sufficient for most uses, although the resultant dried product composition, such as the resultant latex polymer/salt composition, may contain a considerably lower concentration of salt such as greater than typical detectable limits, i.e., greater than about $10^{-7}$ weight percent, and usually greater than about $10^{-4}$ weight percent of salt in the resultant composition.

The presence of the salt dispersed in the resultant latex polymer/salt composition provides an improved electrical (alternating or direct) conductive or semiconductive property compared to the starting latex polymer without the added salt. The resultant latex polymer/salt compositions exhibit conductive properties greater than about $10^{-7}$ Seimens/cm. The resultant latex polymer/salt composition is ordinarily capable of conducting at least 0.5 microamperes of alternating electrical current when 5,000 volts (AC) of electricity are applied between brass electrodes that are one inch apart. One electrical testing apparatus suitable for conducting this test is available from Biddle Instruments (Model No. 22005) of Philadelphia, Pennsylvania. Such electrical conductive properties are applied, as for example, when the product admixture composition is coated and dried on carpet backing fibers to provide antistatic properties to the carpeting.

Other applications for the resultant latex polymer/salt compositions include biocidal polymers, polymers have discoloration retardant properties, polymers useful as delay cross linkers in reservoir plugging, polymer coatings for anodic and cathodic protection, polymers for thermal heating elements, antistatic adhesive tapes, catalytic agents, gloss enhanced polymers, as well as other uses such as laminated coatings as barriers to stain migration in textiles and floor coverings, sorbents containing flame retardant sols, and microwave food coatings.

The invention is further illustrated by the following examples which are illustrative of specific modes of practicing the invention and are not intended as limiting the scope of the invention defined by the appended claims.

EXAMPLE 1

A sol containing cupric acetate is prepared as follows: to a 1 liter container is added 246 grams of ethylene glycol solvent, 166 grams of citric acid (monohydrate) stabilizer, 50 grams of cupric acetate (dihydrate) and 21.4 grams of concentrated nitric acid. From room temperature (about 25° C.), the mixture is slowly heated to 65° C. and held at 65° C. for 10 hours. A clear, transparent product sol is formed having a blue color. The transparent blue-colored sol contains cupric cations, acetate anions and colloidal size cupric acetate salt particles dispersed in the liquid medium. Such a product is cooled to room temperature and the transparent product becomes opaque. An additional 10.7 grams of nitric acid is added to the opaque product which results in the same degree of transparency and clarity as observed at 65° C. The transparent product is a stable sol having a pH of 0.1 and a viscosity of 290 cps.

EXAMPLE 2

Stable citric acid/ethylene glycol/nitric acid sols containing various salts are prepared in the same manner as in Example 1, except various salts require different temperatures sufficient to form the sol. These temperatures and the characteristics of the resulting sols are shown in Table A.

TABLE A

| Salt | Sol Forming Temp. °C. | Product Color | Product pH | Product Viscosity, Cps |
|---|---|---|---|---|
| Aluminum Acetate | 65 | yellow | 0.1 | 445 |
| Aluminum Nitrate | 70 | colorless | 0.1 | 306 |
| Ammonium Acetate | 65 | colorless | 2.4 | 130 |
| Ammonium Molybdate | 45 | yellow | 0.2 | 220 |
| Ammonium Molybdocobaltate | 70 | red | 0.1 | 150 |
| Ammonium Nitrate | 55 | colorless | 0.1 | 186 |
| Antimony Acetate | 70 | colorless | 0.3 | 772 |
| Antimony Ethylene Glycoxide | 40 | colorless | <0.1 | 190 |
| Bismuth Nitrate | 60 | colorless | 0.1 | 253 |
| Boron Acetate | 65 | colorless | 0.1 | 152 |
| Cadmium Acetate | 65 | colorless | 0.3 | 168 |
| Calcium Acetate | 65 | colorless | 0.1 | 180 |
| Cerium Acetate | 70 | colorless | 0.6 | 180 |
| Cerium Nitrate | 45 | pale yellow | 0.1 | 223 |
| Cesium Acetate | 65 | colorless | 0.1 | 150 |
| Chromium Acetate | 65 | green | <0.1 | 169 |
| Cobalt Acetate | 65 | red | <0.1 | 215 |
| Cobalt Silylmolybdate | 70 | orange | 1.0 | 156 |
| Cupric Acetate | 65 | blue | <0.1 | 290 |
| Dysprosium Chloride | 60 | yellow | 0.4 | 334 |
| Dysprosium Nitrate | 70 | yellow | <0.1 | 326 |

TABLE A-continued

| Salt | Sol Forming Temp. °C. | Product Color | Product pH | Product Viscosity, Cps |
|---|---|---|---|---|
| Ferric Citrate | 85 | brown | 0.25 | 262 |
| Lanthanum Acetate | 65 | colorless | 0.1 | 265 |
| Lanthanum Chloride | 65 | colorless | 0.1 | 363 |
| Lanthanum Nitrate | 85 | colorless | 0.1 | 2630 |
| Lanthanum Oxide | | | | |
| Lead Acetate | 65 | colorless | 0.1 | 140 |
| Lithium Acetate | 65 | colorless | 1.8 | 118 |
| Magnesium Acetate | 70 | colorless | 0.7 | 160 |
| Mercuric Acetate | 70 | colorless | 0.1 | 138 |
| Neodymium Chloride | 40 | yellow-green | <0.1 | 200 |
| Neodymium Nitrate | 40 | rose | 0.1 | 193 |
| Nickel Acetate | 65 | green | 0.4 | 188 |
| Nickel Phosphormolybdate | 50 | green | <0.1 | 198 |
| Nickel Silylmolybdate | 80 | black-blue | 0.6 | 390 |
| Nickel Tetrafluoroborate | 50 | green | <0.1 | 246 |
| Potassium Acetate | 65 | colorless | 1.3 | 165 |
| Potassium Phosphate Monobasic | 55 | colorless | 0.7 | 469 |
| Praseodymium Acetate | 65 | green | 0.4 | 120 |
| Silicon Acetate | 70 | colorless | <0.1 | 238 |
| Silver Acetate | 65 | colorless | 0.1 | 166 |
| Sodium Acetate | 65 | colorless | 1.6 | 100 |
| Sodium Chromate | 40 | black-blue | <0.1 | 222 |
| Sodium Molybdate | 45 | yellow | <0.1 | 216 |
| Sodium Vanadate | 80 | black-blue | 3.2 | 131 |
| Strontium Acetate | 60 | colorless | 1.1 | 475 |
| Tetraetylammonium Acetate | 40 | colorless | 1.0 | 139 |
| Tetraethyl-ammonium Chloride | 50 | colorless | 0.1 | 336 |
| Tetramethyl-ammonium Chloride | 50 | colorless | 0.1 | 310 |
| Tetraethyl-ammonium tetrafluoroborate | 60 | colorless | 0.1 | 180 |
| Thallium Acetate | 65 | purple | 0.1 | 168 |
| Thorium Nitrate | 50 | colorless | 0.1 | 211 |
| Titanium Butoxide | 60 | orange | 1.4 | 175 |
| Titanium Ethoxide | 60 | colorless | 0.3 | 154 |
| Titanium Isopropoxide | 60 | colorless | 1.6 | 130 |
| Trimethylbenzyl-ammonium Chloride | 40 | colorless | 0.1 | 290 |
| Uranyl Acetate | 65 | yellow | 0.1 | 201 |
| Yttrium Acetate | 60 | colorless | <0.1 | 370 |
| Yttrium Chloride | | | | |
| Yttrium Formate | 60 | colorless | 0.1 | 393 |
| Yttrium Nitrate | 40 | colorless | 0.1 | 254 |
| Zinc Acetate | 65 | colorless | 0.6 | 258 |

EXAMPLE 3

A sol is prepared in the same manner as in Example 1, except the 166 grams of citric acid monohydrate stabilizer is replaced with 166 grams of a nonionic surfactant stabilizer which is a polyethoxylated nonylphenol surfactant having 9 moles of ethylene oxide per mole. Also, no nitric acid is added to the cooled admixture. The resulting sol is transparent and has a green color, a pH of 2.8 and a viscosity of 155 cps.

EXAMPLE 4

Cupric acetate salt is replaced by other metallic salts in the same method of preparation as in Example 3 (i.e., addition of the nonionic surfactant stabilizer) to produce sols having the color, pH, and viscosity characteristics summarized in Table B below:

TABLE B

| Metallic Salt | Color | pH | Viscosity Cps (Brookfield) | Sol Forming Temp. °C. |
|---|---|---|---|---|
| Aluminum Acetate | Yellow | 1.5 | 185 | 80 |
| Ammonium Acetate | Yellow | 5.9 | 143 | 40 |
| Ammonium Nitrate | Colorless | <0.1 | 126 | 40 |
| Barium Acetate | Colorless | 4.6 | 188 | 40 |
| Calcium Nitrate | Yellow | <0.1 | 180 | 40 |
| Cerous Nitrate | Yellow | <0.1 | 175 | 40 |
| Cobalt Acetate | Red | 3.5 | 186 | 40 |
| Cupric Acetate | Green | 2.8 | 155 | 40 |
| Dysprosium Nitrate | Yellow | <0.1 | 182 | 40 |
| Ferric Nitrate | Orange | 1.1 | 180 | 40 |
| Gadolinium Nitrate | Colorless | 2.3 | 202 | 40 |
| Lanthanum Nitrate | Yellow | <0.1 | 179 | 40 |
| Magnesium Nitrate | Yellow | <0.1 | 188 | 40 |
| Manganous Acetate | Orange | 3.3 | 190 | 40 |
| Mercurous Acetate | Yellow | <0.1 | 134 | 40 |
| Neodymium Nitrate | Pink | 2.9 | 200 | 40 |
| Nickel Nitrate | Green | 3.5 | 204 | 40 |
| Praseodymium Nitrate | Green | 3.0 | 187 | 40 |
| Strontium Nitrate | Yellow | <0.1 | 245 | 40 |
| Titanium Isopropoxide | Yellow | <0.1 | 114 | 40 |
| Uranyl Nitrate | Yellow | <0.1 | 125 | 40 |
| Ytterbium Nitrate | Colorless | 2.6 | 186 | 40 |
| Yttrium Nitrate | Colorless | <0.1 | 190 | 40 |
| Zinc Acetate | Colorless | 3.1 | 175 | 40 |

EXAMPLE 5

Sols containing cupric acetate prepared in the same manner as in Examples 1 and 3, except the stabilizer is replaced in each sol with an individually different nonionic surfactant. Characteristics of the sols including product viscosity, pH, surfactant Hydrophilic-Lipophlic Balance (HLB), and the sol forming temperature are summarized in Table C.

TABLE C

| Nonionic Surfactant | Surfactant HLB | Sol Forming Temp. °C. | Product pH | Product Viscosity, Cps |
|---|---|---|---|---|
| 9 mol EO octylphenol | 13.0 | 85 | 1.7 | 154 |
| 12.5 mole EO octylphenol | 14.6 | 85 | 1.5 | 148 |
| 7.5 mol EO nonylphenol | 12.2 | 85 | 1.5 | 163 |
| 8.5 mol EO nonylphenol | 12.6 | 85 | 1.5 | 149 |
| 9 mol EO nonylphenol | 13.0 | 85 | 2.8 | 155 |
| 10 mol EO nonylphenol | 13.2 | 85 | 1.6 | 160 |
| 10.5 mol EO nonylphenol | 13.6 | 85 | 1.6 | 160 |
| 12 mol EO nonylphenol | 14.2 | 85 | 2.6 | 167 |
| 15 mol EO nonylphenol | 15.0 | 85 | 1.4 | 165 |
| 20 mol EO nonylphenol | 16.0 | 85 | 1.4 | 171 |
| 12 mol EO dodecyl alcohol | 14.5 | 85 | 1.0 | 140 |
| 6 mol EO tridecyl alcohol | 11.5 | 85 | 1.7 | 120 |
| 10 mol EO oleyl alcohol | 11.5 | 85 | 2.7 | 171 |
| 10 mol EO cetyl alcohol | 13.1 | 85 | 3.1 | 183 |
| 20 mol EO oleyl alcohol | 15.3 | 85 | 2.5 | 221 |

TABLE C-continued

| Nonionic Surfactant | Surfactant HLB | Sol Forming Temp. °C. | Product pH | Product Viscosity, Cps |
|---|---|---|---|---|
| 20 mol EO cetyl alcohol | 15.7 | 80 | 1.2 | 210 |
| 23 mol EO lauryl alcohol | 16.9 | 80 | 1.3 | 168 |
| Polyoxethylene glycol 400 | | 85 | 2.6 | 110 |
| Polyoxethylene glycol 600 | | 85 | 2.7 | 120 |
| Polyoxethylene glycol 1000 | | 85 | 2.5 | 140 |
| Polyoxethylene glycol 1500 | | 85 | 2.9 | 165 |
| Pluronic L35* | 18.5 | 80 | 2.8 | 173 |
| Pluronic L64 | 15.0 | 80 | 2.8 | 386 |
| Pluronic P65 | 17.0 | 85 | 3.0 | 984 |
| Pluronic P75 | 16.5 | 85 | 3.1 | 455 |
| Pluronic P84 | 14.0 | 80 | 1.8 | 1288 |
| Pluronic P85 | 10.0 | 85 | 3.1 | 1720 |
| Pluronic P103 | 9.0 | 80 | 2.0 | 1824 |
| Pluronic P104 | 13.0 | 85 | 3.3 | 1432 |
| Pluronic P105 | 15.0 | 85 | 3.0 | 1684 |
| Pluronic P123 | 8.0 | 85 | 1.7 | 2096 |
| Polypropylene glycol 425 | | 85 | 1.4 | 152 |
| 80 mol EO sorbitan monolaurate | 19.7 | 70 | 2.6 | 170 |
| 20 mol EO sorbitan monopalaurate | 15.6 | 80 | 1.2 | 188 |
| 20 mol EO sorbitan monodeate | 15.1 | 80 | 1.3 | 160 |
| 20 mol EO sorbitan monolaurate | 16.7 | 80 | 1.2 | 130 |
| Tetronic 304* | 17.0 | 85 | 2.7 | 155 |
| Tetronic 704 | 15.0 | 85 | 2.7 | 297 |
| Tetronic 904 | 14.5 | 85 | 2.8 | 417 |
| Tetronic 1102 | 5.5 | 85 | 2.9 | 525 |
| Tetronic 1504 | 12.5 | 85 | 3.5 | 717 |

*Pluronic and Tetronic nonionic surfactants contain mixtures of polyols as determined by basic grid FIGS. 2 and 6, pp. 2 and 4, respectively, disclosed in "Pluronic Tetronic Surfactants," copyright BASF (1987).

EXAMPLE 6

Sols containing cupric acetate are prepared in the same manner as in Example 5, except each sol contains a mixture of nonionic surfactants as the stabilizer. The sols exhibit the following characteristics as shown in Table D.

TABLE D

| Nonionic Surfactant Blend | HLB | Sol Forming Temp. °C. | Product pH | Product Viscosity |
|---|---|---|---|---|
| 10 wt. % Pluronic L31* + 90 wt. % L35** | 17.1 | 85 | 2.9 | 173 |
| 90 wt. % Pluronic L35** + 10 wt. % F38*** | 19.7 | 85 | 2.7 | 188 |
| 50 wt. % Igepal CO530 + 50 wt. % Igepal CO890 | 14.3 | 85 | 2.9 | 201 |

Igepal CO530 = 6 mol EO nonylphenol
Igepal CO890 = 40 mol EO nonylphenol
Pluronic *L31 = 10% EO + 90% PO polyglycol MW = 950
**L35 = 50% EO + 50% PO polyglycol MW = 950
***F38 = 80% EO + 20% PO polyglycol MW = 950

EXAMPLE 7

Sols containing cupric acid and zinc acetates/citric acid/nitric acid are prepared in the same manner as in Example 1, except the polyol solvents in Table E are substituted for the ethylene glycol solvent. The temperature required to form the sol, pH of the sol and viscosity of the sol are summarized in Table E.

TABLE E

| M | Solvent | Sol Forming Temp. C. | Product pH | Product Viscosity, Cps. |
|---|---|---|---|---|
| Zinc | glycerine | 65 | 0.2 | 4944 |
| Zinc | propylene glycol | 65 | 0.6 | 686 |
| Zinc | pentanediol | 60 | 0.1 | 1152 |
| Cupric | glycerine | 75 | 0.1 | 3200 |
| Cupric | diethylene glycol | 65 | 0.1 | 2000 |
| Cupric | triethylene glycol | 75 | 0.1 | 3550 |
| Cupric | propylene glycol | 60 | 0.1 | 1182 |
| Cupric | polyoxyethylene glycol 200 | 55 | 0.1 | 780 |

EXAMPLE 8

A cupric acetate salt is admixed with a commercially available latex polymer composition (designated as as "76 RES 4400" available from Union Chemicals Division of Unocal Corp., i.e., "UCD") containing a styrene butadiene rubber (SBR), to produce a noncoagulated product admixture composition containing the stable, latex polymer together with the cupric acetate salt uniformly dispersed in the product admixture. The cupric acetate salt is added to the composition containing the latex polymer by addition of the sol prepared in Example 1 containing the cupric acetate salt.

One part by weight of the cupric acetate-containing sol is admixed with 29 parts by weight of the composition containing the latex polymer to produce a stable, noncoagulated product admixture composition containing cupric acetate salt, including cupric cations, uniformly dispersed in the latex polymer. The stable product admixture indicates the sol and latex polymer are compatible, the resulting latex polymer product admixture being blue in color and no coagulation of the latex polymer composition being observed for at least one month following admixing.

EXAMPLE 9

Several compositions containing latex polymers other than that in Example 8 are admixed in separate tests with the sol of Example 1. The following commercially available UCD compositions containing latex polymer derived by emulsion polymerization are all compatible (i.e., form stable, noncoagulated product admixtures) with the cupric acetate sol when admixed in the same manner as in Example 8: (76 RES 3103) polyvinylacetate, (76 RES 1019) styrene/acrylate, (76 RES 9608) acrylic, (76 RES 701) polyvinylidene chloride and (76 RES 661) vinyl acrylics.

EXAMPLE 10

Citric acid/ethylene glycol/nitric acid sols from Examples 1 and 2 are compatibly combined with 76 RES 4400 in the same manner as in Example 8. The product admixture is prepared in a 3.5 inch Petri dish and air dried at room temperature for 1 week. The dried resultant latex polymer/salt films containing the various salts (and/or cations and/or anions) have the electrical conductivity properties summarized in Table F. The Biddle Model No. 2005 Electric Testing Equipment is used to test the dried resultant latex polymer/salt films. The Biddle Testing Equipment contains brass strips which are placed one inch apart and voltage is applied while determining current flow. The voltage required to produce an alternating electrical current flow of five thousand microamperes is summarized in Table F.

TABLE F

| Sol Used | Voltage AC volts to give 5K microamps |
|---|---|
| 76 RES 4400 | |
| None | >>5K* |
| Aluminum Acetate | 2700 |
| Aluminum Nitrate | 1000 |
| Ammonium Acetate | 950 |
| Ammonium Molybdate | 1700 |
| Ammonium Molybdocobaltate | 1700 |
| Ammonium Nitrate | 1500 |
| Antimony Acetate | 2000 |
| Antimony Ethyleneglycoxide | 2300 |
| Bismuth Nitrate | 950 |
| Boron Acetate | 1800 |
| Cadmium Acetate | 1050 |
| Calcium Acetate | 1300 |
| Cerium Acetate | 1850 |
| Cerium Nitrate | 2700 |
| Cesium Acetate | 1900 |
| Chromium Acetate | 1800 |
| Cobalt Acetate | 2200 |
| Cobalt Silylmolybdate | 3100 |
| Cupric Acetate | 1800 |
| Dysprosium Chloride | 1000 |
| Dysprosium Nitrate | 1000 |
| Ferric Citrate | 2400 |
| Lanthanum Acetate | 2100 |
| Lanthanum Chloride | 2000 |
| Lanthanum Nitrate | 3000 |
| Lanthanum Oxide | 3000 |
| Lead Acetate | 1450 |
| Lithium Acetate | 1600 |
| Magnesium Acetate | 2300 |
| Mercuric Acetate | 4500 |
| Neodymium Chloride | 1150 |
| Neodymium Nitrate | 1500 |
| Nickel Acetate | 1400 |
| Nickel Phosphomolybdate | 3300 |
| Nickel Silylmolybdate | 2050 |
| Nickel Tetrafluoroborate | 2700 |
| Potassium Acetate | 2150 |
| Praseodymium Acetate | 1500 |
| Silicon Acetate | 1400 |
| Silver Acetate | 1350 |
| Sodium Acetate | 1450 |
| Sodium Chromate | 2100 |
| Sodium Molybdate | 4000 |
| Sodium Vanadate | 1700 |
| Strontium Acetate | 1750 |
| Tetraethylammonium Acetate | 1300 |
| Tetraethylammonium Chloride | 3000 |
| Thallium Acetate | 2600 |
| Thollum Nitrate | 890 |
| Titanium Butoxide | 3000 |
| Titanium Isopropoxide | 3000 |
| Uranyl Acetate | 1300 |
| Yttrium Acetate | 700 |
| Yttrium Chloride | 1600 |
| Yttrium Formate | 2000 |
| Yttrium Nitrate | 950 |
| Zinc Acetate | 2350 |

*5000 AC volts gave <0.5 microamp reading

EXAMPLE 11

Some cupric acetate/ethylene glycol/nitric acid sols from Examples 5 and 6 using different nonionic surfactants as stabilizers of the sol are compatibly admixed with 76 RES 4400 SBR latex and dried in the same manner as in Example 10. The dried resultant latex polymer/salt compositions are tested as in Example 10 and the observed current flow data summarized in Table G.

TABLE G

| Nonionic Surfactant | AC volts Applied | AC current, microamperes |
|---|---|---|
| 9 mol EO octylphenol | 2000 | 500 |
| 12.5 mol EO octylphenol | 1000 | 46 |
| 7.5 mol EO nonylphenol | 500 | 2700 |
| 8.5 mol EO nonylphenol | 1300 | 5000 |
| 9 mol EO nonylphenol | 1300 | 5000 |
| 10 mol EO nonylphenol | 2000 | 1300 |
| 10.5 mol EO nonylphenol | 350 | 5000 |
| 12 mol EO nonylphenol | 350 | 5000 |
| 10 mol EO oleyl alcohol | 4000 | 5000 |
| 10 mol EO cetyl alcohol | 3600 | 5000 |
| 20 mol EO oleyl alcohol | 3000 | 5000 |
| 20 mol EO cetyl alcohol | 3800 | 5000 |
| Polyoxyethylene glycol 400 | 1000 | 2150 |
| Polyoxyethylene glycol 600 | 3000 | 820 |
| Polyoxyethylene glycol 1000 | 4000 | 2500 |
| Polyoxyethylene glycol 1500 | 3000 | 2800 |
| Pluronic L35 | 4000 | 5000 |
| Pluronic P65 | 5000 | 2800 |
| Pluronic P75 | 4000 | 2830 |
| Pluronic P84 | 5000 | 1.2 |
| Pluronic P85 | 3000 | 230 |
| Pluronic P103 | 5000 | 2.3 |
| Pluronic P104 | 5000 | 570 |
| Pluronic P105 | 5000 | 71 |
| Pluronic P123 | 5000 | 0.5 |
| Polypropylene glycol 425 | 5000 | 1000 |
| 80 mol EO sorbitan monolaurate | 2900 | 5000 |
| 20 mol EO sorbitan monooleate | 1550 | 5000 |
| 20 mol EO sorbitan monolaurate | 1500 | 5000 |
| 10 wt. % Pluronic L31 + 90 wt. % L35 | 4000 | 990 |
| 90 wt. % Pluronic L35 + 10 wt. % F38 | 5000 | 1880 |
| 50 wt. % Igepal CO530 + 50 wt. % Igepal CO890 | 800 | 5000 |

EXAMPLE 12

Sols prepared in Example 4 are admixed with 76 RES 4400 SBR latex, dried, and the resultant latex polymer/salt compositions tested for electrical conductivity in the same manner as in Example 10. The dried sol/latex products are tested as in Example 10 and the observed current flow data summarized in Table H.

TABLE H

| Salt | Applied AC volts | AC current, microamperes |
|---|---|---|
| Aluminum Acetate | 2000 | 5000 |
| Ammonium Acetate | 1000 | 5000 |
| Cobalt Acetate | 5000 | 900 |
| Cupric Acetate | 1000 | 5000 |
| Mercuric Acetate | 5000 | 1650 |
| Nickel Acetate | 5000 | 400 |
| Uranyl Acetate | 1000 | 5000 |

EXAMPLE 13

Acetate salts in the citric acid/ethylene glycol/nitric acid-prepared sols of Example 2 are admixed with a commercially available UCD composition containing a polyvinylidene chloride latex (76 RES P546 PVDC latex), dried and tested in the same manner as in Example 10. The dried sol/latex products are tested as in Example 10 and the observed current flow data summarized in Table J.

TABLE J

| Cation | AC Volts Applied | AC current, microamperes |
|---|---|---|
| None | 5000 | 85 |
| Aluminum | 3000 | >5000 |
| Ammonium | 4000 | >5000 |
| Cadmium | 5000 | 72 |

TABLE J-continued

| Cation | AC Volts Applied | AC current, microamperes |
|---|---|---|
| Calcium | 5000 | 360 |
| Chromium | 5000 | 95 |
| Cobalt | 4000 | >5000 |
| Cupric | 5000 | 160 |
| Lanthanum | 5000 | 130 |
| Lead | 5000 | 118 |
| Lithium | 4000 | >5000 |
| Magnesium | 5000 | >5000 |
| Nickel | 5000 | 380 |
| Potassium | 5000 | 600 |
| Praseodymium | 5000 | 135 |
| Silicon | 5000 | 129 |
| Sodium | 4000 | >5000 |
| Strontium | 5000 | 210 |
| Uranium | 5000 | 111 |
| Yttrium | 4000 | >5000 |
| Zinc | 5000 | >5000 |

In view of the foregoing description of the invention including the examples thereof, it is evident that many alternatives, modifications, and variations can be made by those skilled in the art without departing from the concept of the present invention. Accordingly, it is intended in the invention to embrace all such alternatives, modifications, and variations as may fall within the scope of the appended claims.

I claim:

1. An electrically conductive polymer composition comprising a nonconjugated latex polymer and a salt in the form of a salt colloidal.

2. A composition containing at least one latex polymer and an organosol or organogel containing a salt, said composition having an electrical conductive property of greater than about $10^{-7}$ Seimens/cm.

3. The composition defined in claim 2 wherein said organosol or organogel comprises an organic solvent, a salt and a stabilizer.

4. The composition defined in claim 3 wherein said salt is in the form of at least one anion and at least one cation or colloidal salt particulates dispersed in said latex polymer.

5. A nonaqueous composition having less than 1 weight percent water and containing at least one latex polymer and a salt in the form of anions and cations or colloidal salt particulates, said composition capable of conducting a greater electrical current flow than that conducted by said composition without said salt.

6. The composition defined in claim 5 wherein said latex polymer is not conjugated and said composition has an electrical semiconductive property.

7. The composition defined in claim 5 wherein said salt is an inorganic salt.

8. The composition defined in claim 7 having a pH less than 7.0.

9. The composition defined in claim 2 capable of conducting a greater alternating electrical current flow than that conducted by said composition without said salt.

10. The composition defined in claim 5 capable of conducting at least 0.5 microamperes of when 5000 volts are applied between brass electrodes that are one inch apart.

11. The composition defined in claim 5 capable of conducting at least 5,000 microamperes of current when less than 5,000 volts are applied between brass electrodes that are one inch apart.

12. The composition defined in claim 1 wherein said latex polymer is selected from the group consisting of:
   (1) conjugated diolefin polymers containing one or more conjugated diene monomers having 4 to 8 carbon atoms and one or more alkenyl substituted monoaromatic monomers;
   (2) olefin-ester interpolymers containing a monoolefin monomer having 1 to 4 carbon atoms and an alkenyl or alkenol ester of a saturated carboxylic acid;
   (3) olefinically unsaturated carboxylic acid ester polymers containing polymerized, olefinically unsaturated monomers containing polymerized olefinically unsaturated carboxylic acid ester monomers;
   (4) polymers of olefinically unsaturated monomers containing alkenyl ether monomer units;
   (5) polymers of vinylidene chloride or vinyl chloride with or without other polymerized, olefinically unsaturated monomers, and
   (6) combinations thereof.

13. The composition defined in claim 1 wherein said latex polymer is selected from the group consisting of:
   (1) conjugated diolefin polymers containing one or more conjugated diene monomers having 4 to 8 carbon atoms;
   (2) olefin-ester interpolymers containing a monoolefin monomer having 1 to 4 carbon atoms and an alkenyl or alkenol ester of a saturated carboxylic acid;
   (3) olefinically unsaturated carboxylic acid ester polymers containing polymerized, olefinically unsaturated monomers containing polymerized olefinically unsaturated carboxylic acid ester monomers;
   (4) polymers of olefinically unsaturated monomers containing alkenyl ether monomer units;
   (5) polymers of vinylidene chloride or vinyl chloride with or without other polymerized, olefinically unsaturated monomers; and
   (6) combinations thereof.

14. The composition defined in claim 2 wherein said salt are in the form of colloidal salt particulates.

15. The composition defined in claim 1 having an electrical conductive property of greater than about $10^{-7}$ Seimens/cm.

16. The composition defined in claim 2 wherein said latex polymer comprises about 40 to about 70 weight percent of said composition.

17. The composition defined in claim 13 wherein said conjugated diolefin polymers containing at least 10 weight percent of said conjugated diene monomers.

18. The composition defined in claim 13 wherein said latex polymer in (1) further comprises one or more alkenyl-substituted monoaromatic monomers.

19. The composition defined in claim 13 wherein said alkenyl-substituted monoaromatic monomers comprise about 1 to about 70 weight percent of said latex polymer in (1).

20. The composition defined in claim 13 wherein said alkenyl or alkenol ester of a saturated carboxylic acid in the olefin-ester interpolymers of (2) comprises at least 10 weight percent.

21. The composition defined in claim 13 wherein said polymerized olefinically unsaturated carboxylic acid ester monomer comprises at least 10 weight percent of the latex polymer of (3).

22. The composition defined in claim 13 wherein said alkenyl ether monomer units in the polymers of (4) comprise at least 10 weight percent.

23. The composition defined in claim 3 wherein said sol or gel has a pH less than about 4.0.

24. The composition defined in claim 3 wherein said solvent is selected from the group consisting of a polyhydroxyl ether and polyhydroxyl alcohol.

25. The composition defined in claim 3 wherein said solvent is selected from the group consisting of ethylene glycol, glycerine, pentanediol, polyoxyethylene glycol, polyoxypropylene glycol, mixed (polyethylene-polyoxypropylene) glycol or blocked (polyoxyethylene-polyoxypropylene) glycol.

26. The composition defined in claim 3 wherein said sol or gel has a pH of less than about 1.0

27. The composition defined in claim 3 wherein said stabilizer comprises a chelator comprising a hydroxycarboxylic acid.

28. The composition defined in claim 27 wherein said hydroxycarboxylic acid is selected from the group consisting of citric acid, tartaric acid, mesotartaric acid, glycolic acid, α-hydroxybutyric acid, mandelic acid, glyceric acid, malic acid and lactic acid.

29. The composition defined in claim 24 wherein said stabilizer comprises a nonionic surfactant having the formula

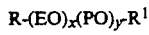

wherein each of R and $R^1$ is independently selected from hydrogen, hydroxyl, alkyl, aryl, monoalkylaryl, dialkylaryl, aliphatic ester and aryl ester radicals, EO is ethylene oxide, PO is propylene oxide, and x and y are nonnegative integers.

30. The composition defined in claim 29 wherein said stabilizer is a glycerine-derived nonionic surfactant having the formula

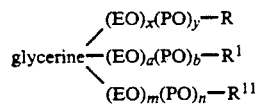

wherein each of R, $R^1$ and $R^{11}$ is independently selected from hydrogen, hydroxyl, alkyl, aryl, monoalkylaryl, dialkylaryl, aliphatic ester and aryl ester radicals, EO is ethylene oxide, PO is propylene oxide and x, y, a, b, m and n are nonnegative integers.

31. The composition defined in claim 29, wherein said stabilizer is a nonionic surfactant comprising 1-100 percent by weight of ethylene oxide in combination with 0-99 percent by weight of propylene oxide and having a molecular weight from 62 to 5,000, or selected from the group consisting of 6-50 mol EO lauryl alcohol, 6-50 mol EO cetyl alcohol, 6-50 mol EO mystryl alcohol, 6-50 mol EO stearyl alcohol, 6-50 mol EO phenol, 6-50 mol EO butyl phenol, 6-50 mol EO octyl phenol, 6-50 mol EO decyl phenol, 6-50 mol EO dodecyl phenol, 6-50 mol EO nonyl phenol, 10-90 mol EO sorbitan monolaurate, 10-90 mol EO sorbitan monocetylate, 10-90 mol EO sorbitan monomystralate and 10-90 mole EO sorbitan monostearate.

32. The composition defined in claim 14 wherein said salt contains a component selected from the group consisting of metallic cations, metallic anions, monomeric nonmetallic cations, monomeric nonmetallic anions, polymeric nonmetallic cations and polymeric nonmetallic anions.

33. The composition defined in claim 32 wherein said metallic cation is selected from the group consisting of antimony, yttrium, cadmium, silver, calcium, cerium, manganese, nickel, niobium, lead, uranium, barium, chromium, cesium, copper, lithium, sodium, potassium, palladium, praseodymium, aluminum, cobalt, iron, gold, lanthanum, magnesium, thallium, zinc, dysprosium, samarium, gadolinium, erbium, strontium, ytterbium, titanium and mercury.

34. The composition defined in claim 32 wherein said salt comprises a cation is selected from the group consisting of ammonium, boron and silicon.

35. The composition defined in claim 29 wherein said monomeric nonmetallic anions are selected from the group consisting of a nitrate, acetate, halide, borate, phosphate, formate, citrate, benzoate, tartrate, silicate, nitrite, and carbonate.

36. The composition defined in claim 32 wherein said polymeric nonmetallic cation is selected from the group consisting of monoolefinic quaternary ammonium cations, diolefinic quaternary ammonium cations, triolefinic quaternary ammonium cations and tetraolefinic quaternary ammonium cations.

37. The composition defined in claim 32 wherein said polymeric nonmetallic anion is selected from the group consisting of alkyl, aryl, ether or alkylaryl sulfonates, sulfates, phosphates, carboxylates and polycarboxylates.

38. The composition defined in claim 29 wherein said component of said salt comprises an element selected from the group consisting of fluorine, oxygen, nitrogen, carbon, tellurium, selenium, phosphorus, sulfur, chlorine, bromine and iodine.

39. The composition defined in claim 32 wherein said metallic-containing anion comprises an element selected from the group consisting of arsenic, chromium, tin, aluminum, titanium, zirconium, vanadium, manganese and molybdenum.

40. A latex composition containing a sol or gel composition, said sol or gel comprising (1) an organic solvent containing ethylene glycol, (2) at least one salt containing a cation and anion or colloidal salt particulate selected from the group consisting of metallic cations or metallic anions, monomeric nonmetallic cations or monmeric nonmetallic anions, and polymeric nonmetallic cations or anions and polymeric metallic cations or anions, and (3) a stabilizer comprising a nonionic surfactant having the formula:

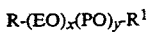

wherein each of R and $R^1$ is independently selected from hydrogen, hydroxyl, alkyl, aryl, monoalkylaryl, dialkylaryl, aliphatic ester and aryl ester radicals, EO is ethylene oxide, PO is propylene oxide, and x and y are nonnegative integers.

41. The composition defined in claim 40 wherein said stabilizer is a nonionic surfactant comprising 1-100 percent by weight of ethylene oxide in combination with 0-99 by weight of propylene oxide and having a molecular weight from 62 to 5,000, or selected from the group consisting of 6-50 mol EO lauryl alcohol, 6-50 mol EO cetyl alcohol, 6-50 mol EO phenol, 6-50 mol EO butyl phenol, 6-50 mol EO octyl phenol, 6-50 mol EO decyl phenol, 6-50 mol EO dodecyl phenol, 6-50 mol EO nonyl phenol, 10-90 mol EO sorbitan monolaurate, 10-90 mol EO sorbitan monocetylate, 10-90 mol EO sorbitan monomystralate and 10-90 mol EO sorbitan monostearate.

42. The composition defined in claim 40 wherein said polymeric cations are selected from the group consisting of monoolefinic quaternary ammonium cations, diolefinic quaternary ammonium cations, triolefinic quaternary ammonium cations and tetraolefinic quaternary ammonium cations.

* * * * *